United States Patent [19]
Rink et al.

[11] Patent Number: 5,427,363
[45] Date of Patent: Jun. 27, 1995

[54] END EFFECTOR

[75] Inventors: Philip A. Rink, Everett; Mark S. Soderberg, Issaquah; Jeffrey R. Gueble, Seattle; Joseph P. Giamona, Carnation, all of Wash.

[73] Assignee: CNA Manufacturing Systems, Inc., Redmond, Wash.

[21] Appl. No.: 77,552

[22] Filed: Jun. 14, 1993

[51] Int. Cl.⁶ ............................................. B23B 31/30
[52] U.S. Cl. ...................................... 269/21; 269/75; 269/329
[58] Field of Search ...................... 269/21, 71, 76, 75, 269/329; 279/3; 294/64 R; 51/235

[56] References Cited

U.S. PATENT DOCUMENTS

| | | | |
|---|---|---|---|
| 4,491,306 | 1/1985 | Eickhorst | 269/21 |
| 4,527,783 | 7/1985 | Collora et al. | |
| 4,684,113 | 8/1987 | Douglas et al. | 269/21 |
| 4,693,458 | 9/1987 | Lewecke et al. | 269/21 |
| 5,110,239 | 5/1992 | Riley et al. | |
| 5,139,245 | 8/1992 | Bruns et al. | 269/21 |
| 5,143,360 | 9/1992 | Wilken et al. | 269/21 |
| 5,279,493 | 1/1994 | Halder | 269/329 |
| 5,316,276 | 5/1994 | Heinle | 269/21 |
| 5,318,005 | 6/1994 | Mayer | 269/21 |

OTHER PUBLICATIONS

Yvonne Higgins, "CQI: Abrasive water jet trims composite skin panels for 777", *Boeing News*, Apr. 16, 1993, p. 2, Seattle, Wash.

*Primary Examiner*—Robert C. Watson
*Attorney, Agent, or Firm*—Dellett and Walters

[57] ABSTRACT

An apparatus for holding a workpiece to a known position without regard to the angularity of the surface of the workpiece at the point of contact with the apparatus includes a disk shaped, substantially flat contact pad for engaging the workpiece. The surface of the contact pad opposite the workpiece is substantially spherical and fits in a conical seat so that the center point of the upper surface of the contact pad is always at an known position when the contact pad is seated, without regard to the angularity of the contact pad. A proximity detector determines when the contact pad is seated providing an indication to an operator that the workpiece is properly engaged by the apparatus. The contact pad is contained within the interior of a suction cup that engages the workpiece whereupon externally supplied vacuum pulls the suction cup and the workpiece together. A second embodiment employs the contact pad with an aperture therethrough so as to provide fluid communication to an air supply passing through the contact seat. The air supply provides an air bearing to enable a workpiece to be slid on a cushion of air.

19 Claims, 7 Drawing Sheets

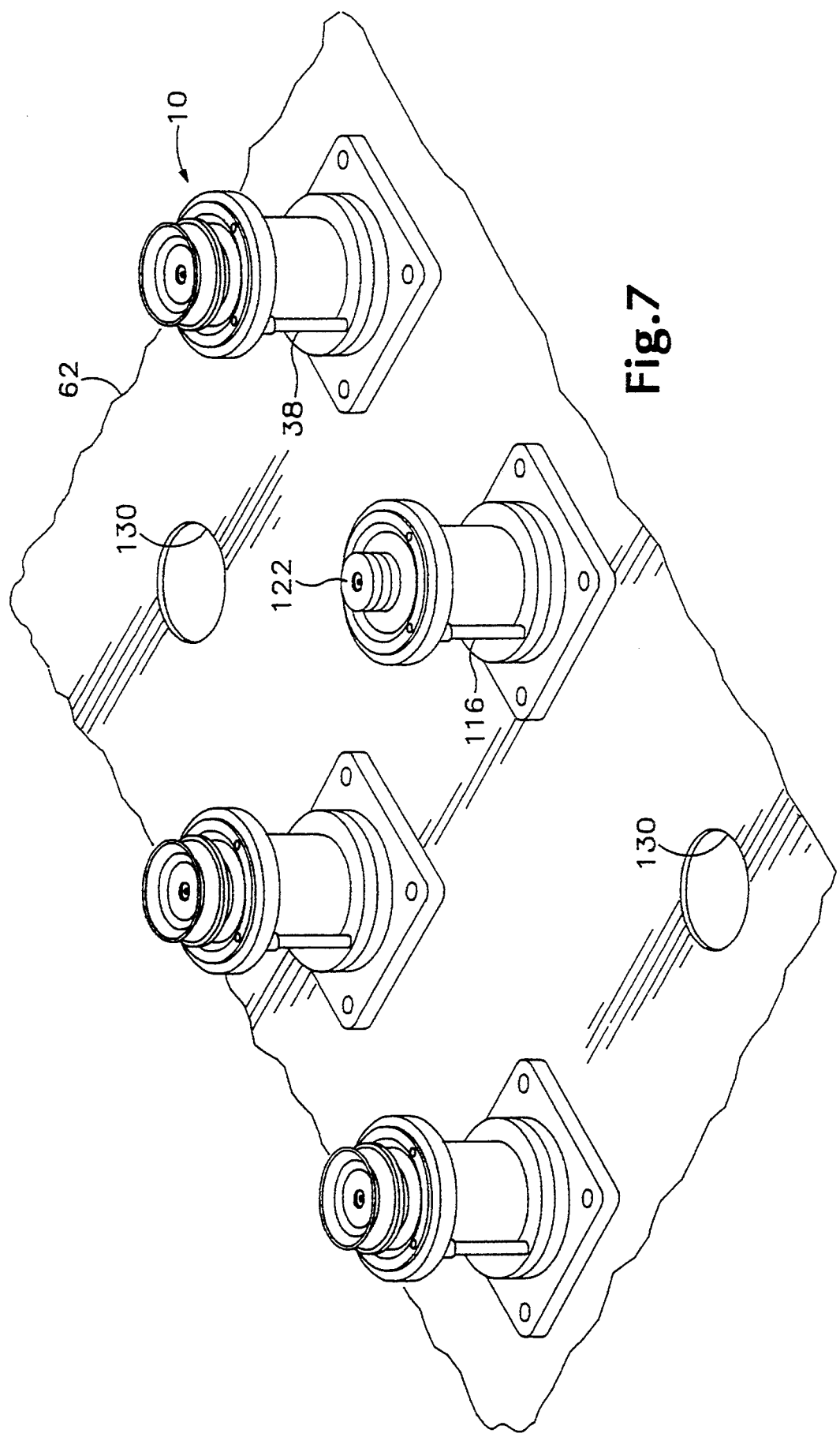

END EFFECTOR

BACKGROUND OF THE INVENTION

This invention relates to manufacturing of workpieces and more particularly to apparatus and methods for positioning and holding workpieces during manufacturing operations.

In the manufacture of formed sheets of composite materials, for example, the material sheet or workpiece is typically formed to a particular shape and then trimmed to precisely fit the particular application. In the case of composite materials as used in the manufacture of aircraft, although the material is preformed to an appropriate shape, the material will bow or flex when removed from the tool used in forming. Therefore, when trimming the material, it is desirable to hold the material in its designed shape to allow precise trimming. In the past, the material would be held through the use of dies or tools which were of the same shape as the tool employed during forming. The material would be placed against the tool and held via clamping while further manufacturing operations were performed. Such operations may have included, for example, trimming the material to a proper size and shape. In accordance with this prior method, because each material sheet would likely have a contour that depended on the particular application, a separate tool was required for each part. The associated costs in storing and the setup time required to employ these tools was high. For example, in manufacturing a stabilizer from composite materials for a jet airliner, the tool necessary to hold the composite material in shape during trimming operations would be massive and of great weight, just in order to be able to support itself. The tool would then need to be stored when not in use and methods of moving the tool around to bring it to the appropriate point in the manufacturing area would need to be devised.

In order to avoid the tooling problem noted hereinabove, variable tooling fixtures have been devised wherein the shape or contour of the tooling fixture may be changed to accommodate a particular application. However, in order to have precise shapes required for aerodynamic surfaces, for example, it is desirable to have a workpiece precisely held to a tooling fixture. In the past, clamps have been used to hold material sheets to these fixtures, but such methods do not sufficiently hold the workpiece to the tool in some applications. Further, it often necessary to remove the clamps to enable trimming around a clamped area, slowing down operations and requiring manual intervention to reposition the clamps, thereby making the manufacturing process less automated. To avoid the clamping problems, systems employing vacuum suction to hold the workpiece to its particular shape have been devised. In such systems, it becomes desirable to determine whether the vacuum contact has been made as desired and to quickly locate any points on the workpiece where the workpiece is not pulled to the tool as tightly as needed for precise operations.

When devising a variable shape tooling fixture, it is desirable to be able to accurately determine the points in space where the tooling fixture contacts a particular workpiece, in order to be able to precisely hold the workpiece to a known position in space. A factor that complicates making such a determination is that the material of which the workpiece is comprised may be susceptible to damage if a tooling fixture employs a point contact with the workpiece. A surface area of contact must be used in order to avoid damaging the workpiece. However, if the tooling fixture employs a surface to contact the workpiece, determining the precise point in space of the workpiece when juxtaposed with the tooling fixture becomes difficult, since in a general case, the workpiece will be curved rather than flat. The tooling fixture must therefore provide a non-point contact with the workpiece but still be able to adapt to a general curved surface, while allowing precise determination of the position in space where the tooling fixture and workpiece make contact. Systems employing a vacuum have in the past used articulated vacuum cups that would tilt in two planes. However, providing vacuum through the area of articulation results in a complicated system which is difficult to manufacture in order to supply the needed vacuum while still allowing articulation.

Another problem arises when cutting workpieces of composite materials, for example, when the composite material includes graphite. Trimming operations in such case are likely to generate graphite particles which are conductive and therefore harmful to electrical systems unless precautions are taken to prevent graphite dust from reaching electrical systems. Therefore, any tooling fixture must be protected against damage from such particles.

SUMMARY OF THE INVENTION

According to a first aspect of the invention, there is provided an apparatus for engaging a workpiece comprising a sealing means for engaging a surface of the workpiece and for providing a substantially air tight seal against the surface of the workpiece and defining a vacuum plenum within the boundaries of the sealing means and the surface of the workpiece. A vacuum supply means provides vacuum to the vacuum plenum. A contact pad is positioned within the sealing means and is adapted to contact the surface of the workpiece along an area thereof. Swivel means enables the contact pad to swivel in two planes while maintaining a contact point on the surface of the contact pad at a known position for engaging the workpiece at a known position without regard to the angularity of the workpiece. A sensor means determines when the contact pad is in contact with the surface of the workpiece.

According to a second aspect of the invention, an air bearing apparatus for engaging a workpiece and providing a cushion of air between the workpiece and the apparatus comprises a contact pad positioned on a support member and adapted to be in juxtaposition with a surface of the workpiece along an area thereof. An air supply means provides air to the surface of the contact pad for enabling the workpiece to translate relatively freely in a plane parallel to the plane of the surface of the contact pad. Swivel means is provided for enabling the contact pad to swivel in two planes while maintaining a contact point on the surface of the contact pad at a known position for engaging the surface of the workpiece at a known position.

In accordance with another aspect of the invention, a system for supporting a workpiece in a known configuration comprises a plurality of actuators in spaced relation to one another, wherein ones of the actuators are adapted to translate in at least one axis. First ones of the actuators carry an apparatus for engaging a workpiece in accordance with the first aspect of the invention.

In accordance with yet another aspect of the invention, a system for supporting a workpiece in a known configuration comprises a plurality of actuators in spaced relation to one another, wherein ones of the actuators are adapted to translate in at least one axis. First ones of the actuators carry an apparatus for engaging a workpiece in accordance with the second aspect of the invention.

It is an object of the present invention to provide an improved apparatus for supporting a workpiece with a surface contact at a precise location which may be determined without regard to the angularity of the workpiece relative to the support.

It is another object of the present invention to provide an improved system for providing support to a plurality of workpieces having unique configurations without requiring individual form tools for each unique workpiece.

It is a further object of the present invention to provide an air bearing that will support a workpiece while allowing relative ease of movement of the workpiece on a cushion of air while maintaining the workpiece at a precisely determined position.

It is another object of the present invention to provide an improved apparatus for supporting relatively narrow workpieces so as to prevent angular twisting of the workpiece while maintaining the workpiece at a known height.

A further object of the present invention is to provide an improved articulated vacuum contact at a known spatial position without the difficulty of supplying vacuum through an articulated joint.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 7 is a perspective view illustrating a typical arrangement of a variable shape tooling fixture employing both an air bearing and end effectors.

DETAILED DESCRIPTION

Figure 1:
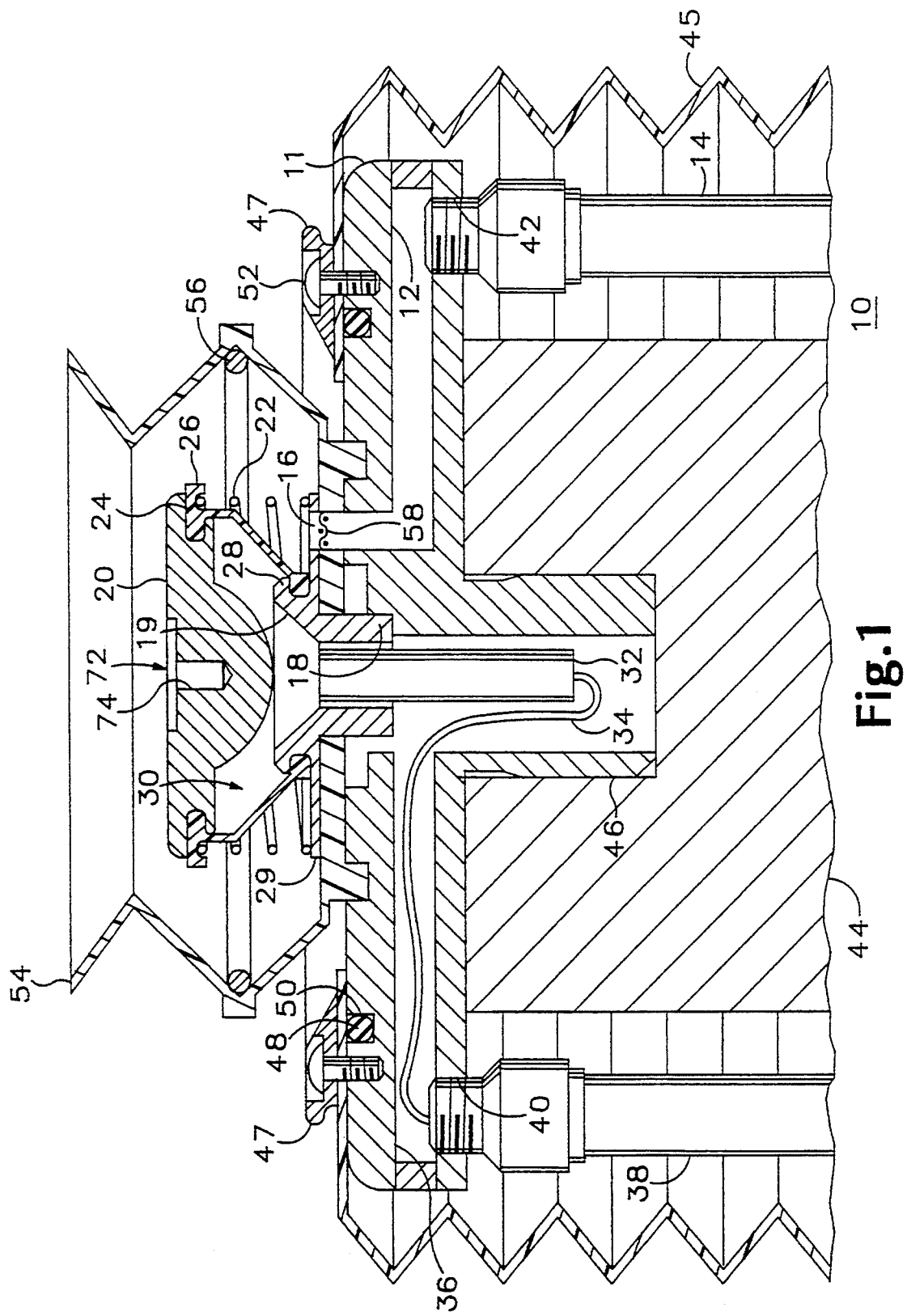
FIG. 1 is a sectional view of an end effector as installed on a supporting stanchion assembly.

In accordance with the present invention, an end effector provides suction engagement with a workpiece with a surface contact while enabling precise determination of the spatial position of the workpiece. FIG. 1 is a sectional view of an end effector 10 installed on a stanchion support in accordance with the present invention. The end effector includes a base member 11 that is substantially plate-shaped and that includes a vacuum passageway 12 in communication with a vacuum line 14. The passageway 12 extends inwardly from the outer perimeter of the base member 11 to an opening 16 more central of the base member. The central portion of the base member has a contact seat 18 positioned therein, with a conical seat area 19 adapted to receive contact pad 20 which is spherically shaped at the portion thereof engaging contact seat area 19. The contact pad is held in spaced relationship away from the contact seat via support spring 22. Contact pad 20 is suitably disk shaped when viewed from above and includes a lip area 24 around the periphery thereof which is in engaging relation with a urethane shroud 26. The shroud engages the contact pad around the periphery so as to substantially seal an inner portion of the contact pad from external environmental conditions. A lip member 28 extends around the periphery of the contact seat and urethane shroud 26 also engages the contact seat at the lip member, so as to provide a sealed volume 30 between the contact seat and the contact pad. The spherical portion of the contact pad is adapted to engage the conical portion 19 of contact seat 18 while enabling the contact pad to freely tilt in two planes.

Mounted at the base of contact seat 18 is a proximity detector 32 which is electrically connected to external components via electrical wiring 34. The electrical wiring 34 passes through a channel 36 defined in the base member 11 that extends from centrally of the base member toward an outer periphery of the base member. In the illustrated embodiment, channel 36 extends in an opposite direction from vacuum passageway 12. The electrical wires 34 extend through electrical conduit 38 which is in engaging relationship with the base member at an aperture 40. For example, the conduit may be threadably received at the aperture as illustrated in FIG. 1 so as provide a seal that is substantially dust tight and/or airtight. Similarly, vacuum supply line 14 is threadably attached to base member 11 at an aperture 42 so as to provide a leak-free vacuum supply to vacuum passageway 12.

Base member 11 is set on a stanchion 44 which receives a flared portion 46 of the base member in a corresponding bore at the top of stanchion 44. A flexible urethane sheet bellows 45 surrounds the stanchion 44 and extends up to and over the periphery of base member 11. The bellows is secured to the top surface of base member 11 via a sealing flange 47 which extends around the periphery of base member 11. An O-ring 48 also extends substantially co-extensively with the flange 47 such that the upper extent of the bellows is secured between the O-ring and the flange 47. The O-ring suitably rests within an O-ring groove 50 on the surface of base member 11 such that when mounting flange 47 is fastened to the top of base member 11 (for example, via machine bolts 52) a seal is provided to prevent dust, for example, from entering the space defined between bellows 45 and stanchion 44.

The upper surface of base member 11 also carries a suction cup 54 which is suitably elastic and somewhat bellows-shaped so as to provide relative freedom of flexing movement in relation with an object to which the suction cup may be adhered. The cup employs a stiffening spring member 56 which runs the extent of the suction cup at the lower bellow's pivot point thereof to provide stiffening so that the suction cup does not collapse in presence of a vacuum. The suction cup suitably is received in a fixed relation to the base member in an annular groove in the face of base member 11 that is of corresponding shape to a tab on the bottom face of the suction cup. In the illustrated embodiment, a radial flange portion 29 of valve seat 18 is employed to hold the suction cup in position relative to base member 11.

As noted hereinabove, the vacuum supply passageway 12 opens into the space defined in the interior of suction cup 54 at aperture 16. A filter screen 58 may also be provided therein so as to prevent undesired particulate matter from being sucked into vacuum passageway 12 when vacuum is present. In operation, the suction cup is provided vacuum via vacuum passageway 12 so as to hold the suction cup in tight engagement with a workpiece and hold the workpiece downwardly, thereby causing the workpiece to meet contact pad 20 and move the contact pad downwardly such that the spherical portion of the contact pad engages the conical seat portion 19 of contact seat 18.

Figure 2:
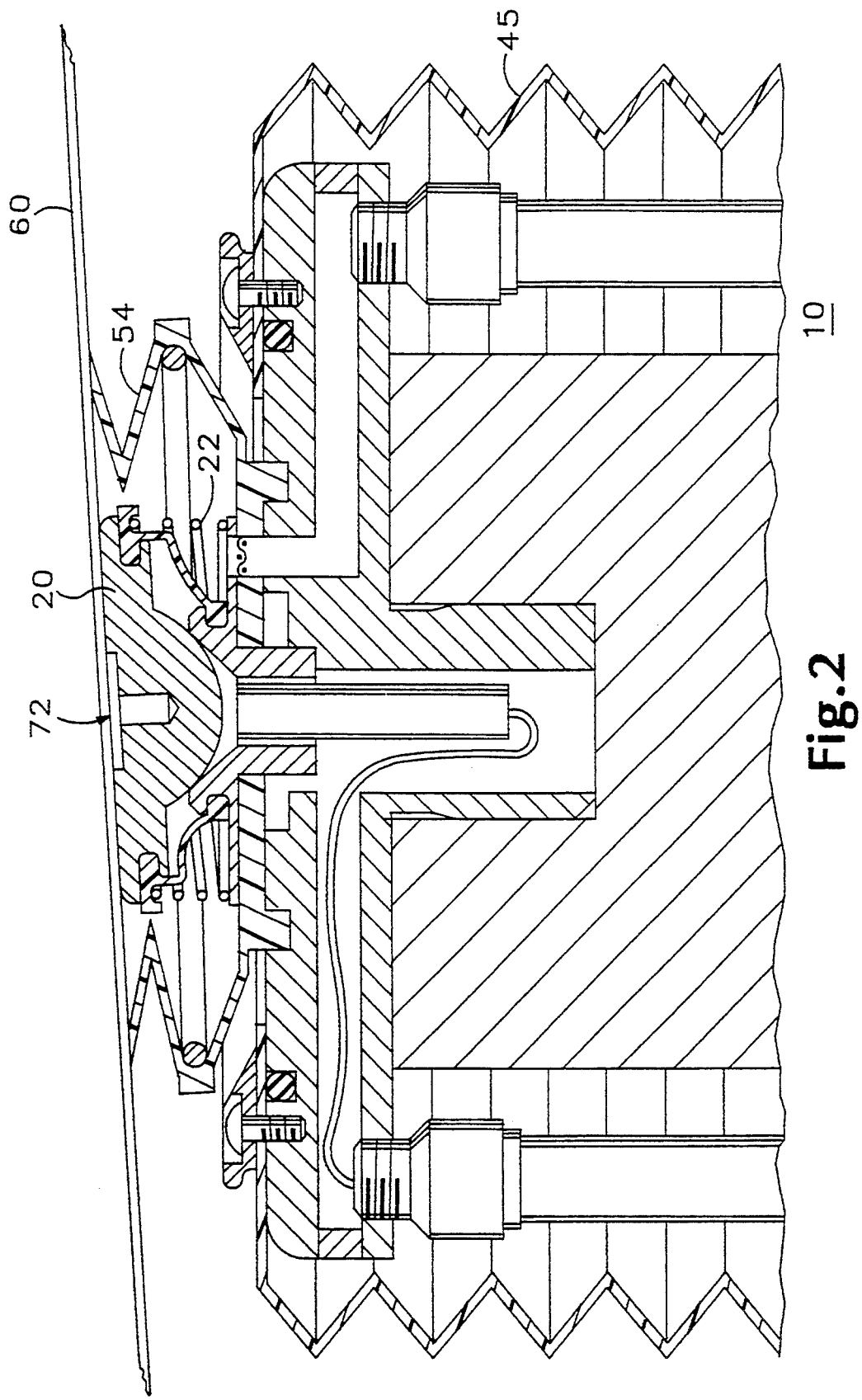
FIG. 2 is a sectional view of the end effector of FIG. 1 illustrating the position of the various parts when a workpiece is positioned thereon.

Referring to FIG. 2, a sectional view of an end effector according to the present invention with a workpiece resting thereon, it may be observed that when workpiece 60 comes into contact with suction cup 54, the vacuum will cause the workpiece to be drawn downwardly, thereby moving contact pad 20 into firm engagement with contact seat 18. In the illustration of FIG. 2, it may be observed that spring 22 thereby compresses. When contact pad 20 is then firmly in seat 18, the proximity detector 32 will sense that the contact pad has seated and will provide an open (or depending on implementation, closed) circuit conveyed via wires 34. In this manner, the end effector is able to provide an indication that workpiece 60 is appropriately seated against contact pad 20. By tightly controlling the actuation point of the proximity switch, this indication may be used, for example, to provide an operator of a device employing the end effector an indication as to whether the panel is being held to the desired contour to within a given tolerance.

Contact pad 20, its spherical surface and seat 18 together provide swivel means. The use of the spherical surface on the bottom of the contact pad 20 provides an advantage in that the spatial position at the center 72 of the upper surface of the contact pad will always be known regardless of the angularity of the till of the workpiece at that particular point. Thus, the proper height may be precisely maintained at the end effector/stanchion configuration so as to allow for precision positioning of the workpiece. The use of the contact pad and seat in conjunction with the fixed suction cup 54 provides further advantages over the prior art since the vacuum supply is provided through a non-articulated point, and any articulation occurs within the vacuum plenum defined by the engagement of suction cup 54 and workpiece 60. Contact pad 20 is able to articulate within the vacuum plenum. Also, since the proximity sensor does not articulate, the wiring from the sensor does not pass through an articulated joint, allowing easier implementation.

Figure 3:
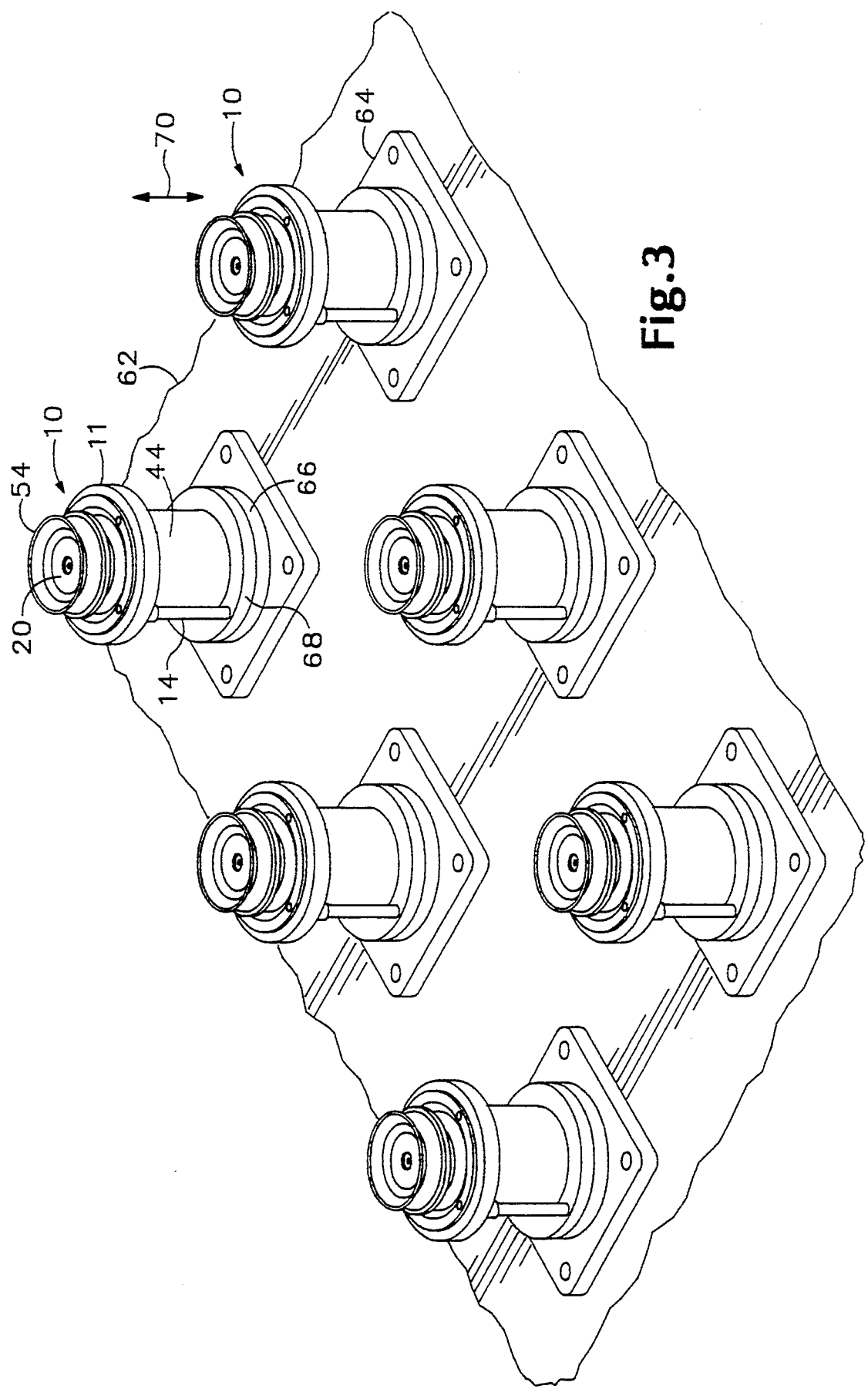
FIG. 3 is a perspective view of an illustrative arrangement of plural end effectors and supporting structure as would be used in a variable shape tooling fixture employing the end effectors.

FIG. 3 illustrates a typical installation employing the end effector 10. A support table 62, substantially planar in configuration, carries a series of spaced end effectors 10 supported by stanchions 44. It will be noted in FIG. 3 that the bellows 45 are removed for clarity of illustration. An individual stanchion further comprises a base 64 including a fixed portion that engages support table 62 and a movable portion that is extendible to allow the stanchion and the end effector to extend or contract so as to vary its relative height above the surface of support table 62. The stanchion includes a fixed ring portion 66 and a movable ring portion 68 sitting atop the fixed ring portion. In operation, the stanchions are extensible and retractable in the plane defined by arrows 70, i.e., the vertical plane relative to the substantially horizontal support table 62. The lower limit of retraction is definable by fixed ring 66 which, when contacted by ring 68, will prevent further retraction. The operational elements responsible for the extension and retraction are described in connection with FIG. 4 herein.

In use, a workpiece that is to be supported by the array of end effectors and corresponding stanchions will have a particular non-planar configuration. Therefore, to support the workpiece in its desired shape, the various stanchions are raised or lowered to particular heights above support table 62 so as to support the workpiece in its particular shape and configuration. Each of the various stanchions is independently movable to a height as may be different than the height of corresponding other stanchions. The result is that a so-called universal tooling fixture is provided which is adaptable to support a variety of differently shaped workpieces without the need to employ a separate form tool for each workpiece configuration. The resulting savings regarding space for storage and setup time are substantial.

In a particular embodiment of the support table, stops may be provided to meet the edges of a workpiece. The workpiece is moved up against the stops, resulting in proper positioning of the workpiece in two dimensions. Once the workpiece is so positioned, the vacuum supply to each of the end effectors may then be engaged so as to cause the suction cup 54 to pull the workpiece into close engagement with the contact pad, thereby pulling the contact pad down against the contact seat and as a result, properly positioning the workpiece in a third dimension. As noted hereinabove, once the contact pad is properly seated on contact seat 18, the proximity detector will provide an indication via wires 34 that the workpiece is properly engaged at that particular end effector/stanchion. The information from the proximity detectors at each of the end effectors may then be employed to provide an indication to an operator whether the workpiece is properly seated at each of the support positions, thereby allowing the operator to take corrective measures. It is desirable to be able to use this indication to locate stanchion/end effector positions where the contact pad is not properly engaged so as to insure that the workpiece is held in precisely the proper configuration to allow further work, for example, cutting or trimming of the workpiece. If the workpiece were not properly positioned, cutting or trimming operations could result in an improperly dimensioned workpiece.

Referring again to FIG. 1, contact pad 20 may also be provided with an aperture 74 bored at the center thereof so as to receive, for example, a target which would be recognized by a vision system, a touch probe or other position measuring means. Such a configuration would be advantageous, for example, in a system wherein certain ones of the end effector/stanchion combinations would be recognized by a vision system for positioning a workpiece prior to setting the workpiece onto the support table/stanchion apparatus.

Since the end effector/stanchion combination is adapted for use in operations wherein a workpiece is trimmed, for example, wherein a composite material is trimmed via an abrasive water jet, the urethane shroud 26 cooperates with the contact pad 20 and contact seat 18 so as to provide a sealed area around the contact pad and the contact seat to thereby prevent contaminants, for example, particulates resulting from a trimming operation, from entering the contact seat and preventing proper engagement between the contact pad and the contact seat. Similarly, the bellows 45 in conjunction with flange 47 and O-ring 48 respectively seal the exposed portions of the stanchion 44 against contamination via particulate matter or liquids which may be present during work operations performed on the workpiece. As noted hereinabove, screen 58 also prevents particulate matter from entering and blocking the vacuum supply lines.

Figure 4:
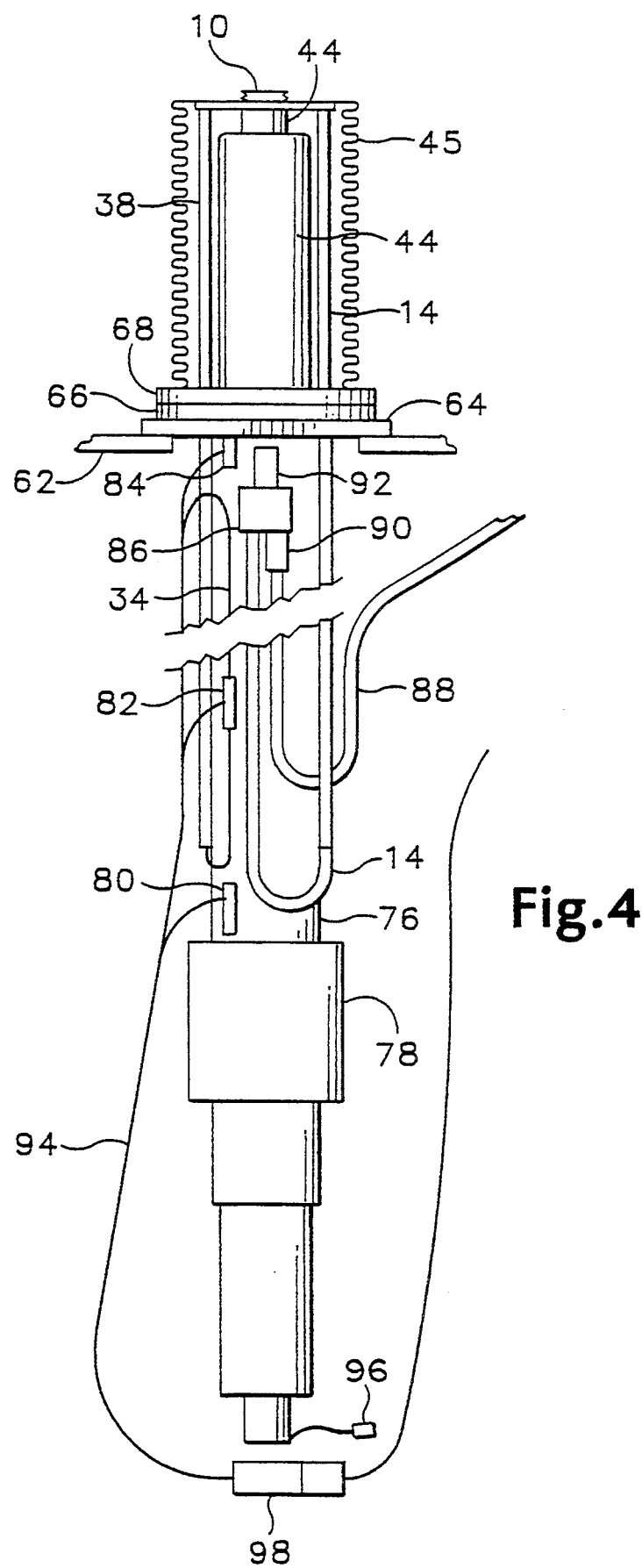
FIG. 4 is a sectional view of the extension and contraction components of an individual support stanchion of the tooling fixture of FIG. 3.

Referring now to FIG. 4, a cut-away view of a single stanchion, or actuator, and the attendant components for raising and lowering the end effector attached thereto, it may be noted that the stanchion base 64 is mounted to support table 62. Bellows 45 and end effector 10 are positioned above the surface of the support table. Located below the support table are various components for enabling raising and lowering, as well as the vacuum supply and electrical connections to the proximity detector. The stanchion extends substantially below the table and includes a tubular member 76. Positioned near the bottom of tube 76 is servo motor 78 which is directly coupled to a ball screw (not shown). Coupled to tube 76 is a nut that is engaged by the ball screw such that when servo motor 78 turns, the nut travels within the ball screw so as to raise or lower the tube 76 and accordingly the stanchion 44. Raising or lowering is dependent upon the direction of travel of the servo motor and the ball screw.

Positioned along the extent of tube 76 are a series of limit switches. Lower limit switch 80 is placed at a lower position of the tube to define the lower limit of travel. Mid-point switch 82 is attached somewhat centrally of the tube so as to provide a mid-point or home resting sense point. Upper limit switch 84 is located near the upper extent of tube 76 and serves to define the upper limit of travel, such that when the stanchion is extended to a particular point, upper limit switch 84 is engaged thereby providing an indication that the servo motor should stop operation. The proximity sensor wires 34 also are visible and it will be noted that a certain amount of slack is provided so as to allow the sensor wire to play in and out along with the extension and retraction of the tube.

An electronic vacuum switch 86 is positioned centrally of the tube member 76 and receives external vacuum supply from field vacuum hose 88. The vacuum switch is further coupled to vacuum supply 14 which carries the vacuum up to the end effector. As with sensor wire 34, vacuum supply hose 14 is also provided with a certain amount of slack so as to allow the vacuum hose to play in and out during extension and retraction of the tube. The external vacuum supply may be connected to vacuum switch 86 via connector 90 so as to allow quick attachment and removal of vacuum from the external source. The electrical wire 92 from vacuum switch 86 is suitably provided along with limit switch sensor wires and proximity detector wires in a wiring bundle 94 so as to allow the signals to be carried back to a central location to enable appropriate sensing and response to their signals. Power to the servo motor is provided via power cables 96. A disconnect block 98 may also be provided for wiring bundle 94 to allow easy disconnection from a central control wiring system.

In operation, power is applied to servo motor 78 via power cables 96 for a period of time appropriate to cause the motor to either extend or retract from the home position (as defined by midpoint switch 82) to raise or lower the effective height of the end effector to a given position. The amount of raising or lowering is responsive to the ball screw employed as well as the servo motor and is determined experimentally during calibration. Once the various end effectors are positioned at their respective desired heights, the vacuum supply for the end effectors is turned on. The vacuum in conjunction with suction cups 54 will pull the workpiece tightly against the end effectors. Vacuum switch 86 will actuate in the presence of vacuum at a selected level and provide an indication of an adequate seal between suction cup 54 and the workpiece. If the seal is not properly obtained, vacuum switch 86 will not actuate since, as a result of leakage, the selected level of vacuum will not be present. The actuation state of switch 86 as conveyed by wire 92 may then be employed to indicate that the proper seal between the workpiece and suction cup 54 is obtained at all appropriate locations and to direct an operator to specific suction cups that may require corrective action. The particular configuration and shape of a particular workpiece will determine which vacuum supplies are turned on to which stanchions, since not all stanchions may be used for a given workpiece. For example, the workpiece may be of a shape such that it does not cover all the stanchions for a given system setup.

Figure 5:
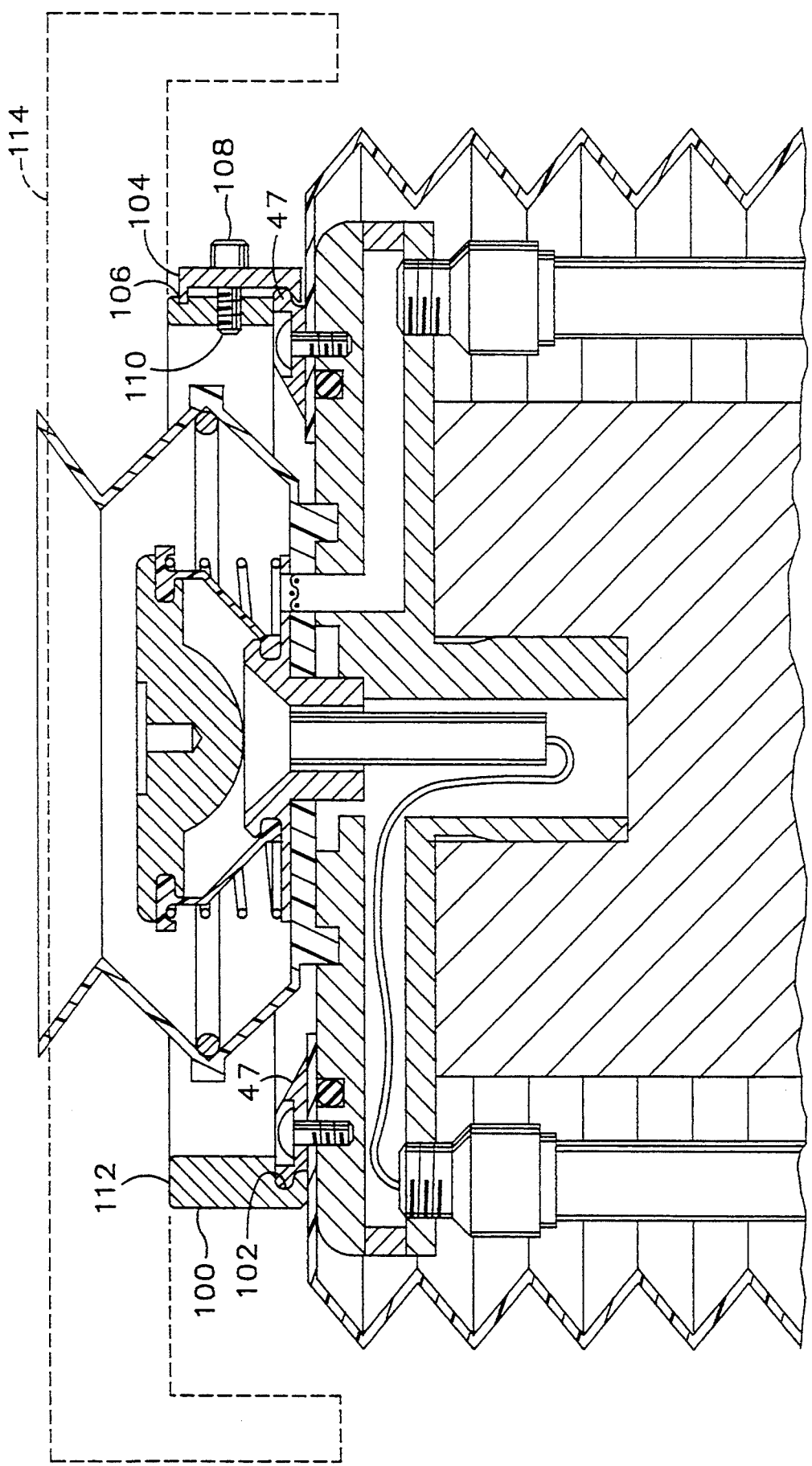
FIG. 5 is a sectional view of the end effector with an auxiliary support ring attached thereon.

In a particular application, e.g. employing the present invention for working on front or rear spars for horizontal stabilizers for an airplane, the workpieces may be relatively narrow with respect to their overall length. For example, a typical workpiece might be 8 inches wide at its narrowest and may extend some 50 or 60 feet. With such a workpiece, there is only enough area on the workpiece to employ a single row of stanchion/end effectors. Since the end effectors do not resist angular change with respect to the workpiece, it becomes desirable to provide additional support for a narrow workpiece to prevent twisting of the workpiece. Therefore, an additional embodiment of the invention is illustrated in FIG. 5. The embodiment of FIG. 5 employs the end effector and stanchion as described hereinabove with the addition of a support ring to provide a wider support base for the workpiece. Referring to FIG. 5, the support ring 100 is suitably an annular ring that carries a groove 102 along an inner portion thereof, suitably along a 120° arc of the ring. The groove is dimensioned to fit in engaging relation with support flange 47 on the end effector. The support ring receives a mounting clamp 104 at a side opposite the portion carrying the groove 102. The mounting clamp fits within a groove 106 on the outer periphery of the ring 100 and is adapted to then extend to and fit over mounting flange 47. A screw 108 is then inserted through an aperture in the mounting clamp into a threaded aperture 110 in the support ring, whereupon the screw is tightened to secure the support ring to the mounting plate. The screw is suitably tightened by hand. The ring is constructed such that it is of a height above mounting flange 47 such that the upper edge 112 of the support ring is of the same height or slightly higher than the height of the contact pad when the contact pad is fully seated against the contact seat. The height of the support ring provides a hard engagement between the support ring and the workpiece, pushing the contact pad downwardly to the contact pad seat so as to enable the proximity switch to indicate an engaged condition. In a particular embodiment, the support ring is machined from 4 inch schedule 40 pipe. The groove 102 within the support ring is preferably formed along an arc of 120° or less in extent along the inner periphery of the support ring, in order to enable the support ring to be easily slid onto the end effector without requiring removal of the suction cup 54. Thus, to install the support ring, the support ring is placed over the suction cup and lowered toward mounting flange 47. The groove 102 is then positioned so as to engage mounting flange 47 whereupon the mounting clamp is attached to the support ring and tightened to prevent the ring from working loose. A workpiece 114, illustrated in phantom in FIG. 5, then rests upon the support ring 112, providing additional stabilization to prevent twisting of the workpiece. It should be noted, however, that the support ring may be omitted when workpiece configurations are such that the workpiece is supported along more than a single row of end effector/stanchions. When the particular application no longer requires the support ring, then it may be easily removed by loosening of screw 108 thereby enabling removal of clamp 104. The support ring 112 is then slipped away from the mounting flange 47 and stored for future use.

Figure 6:
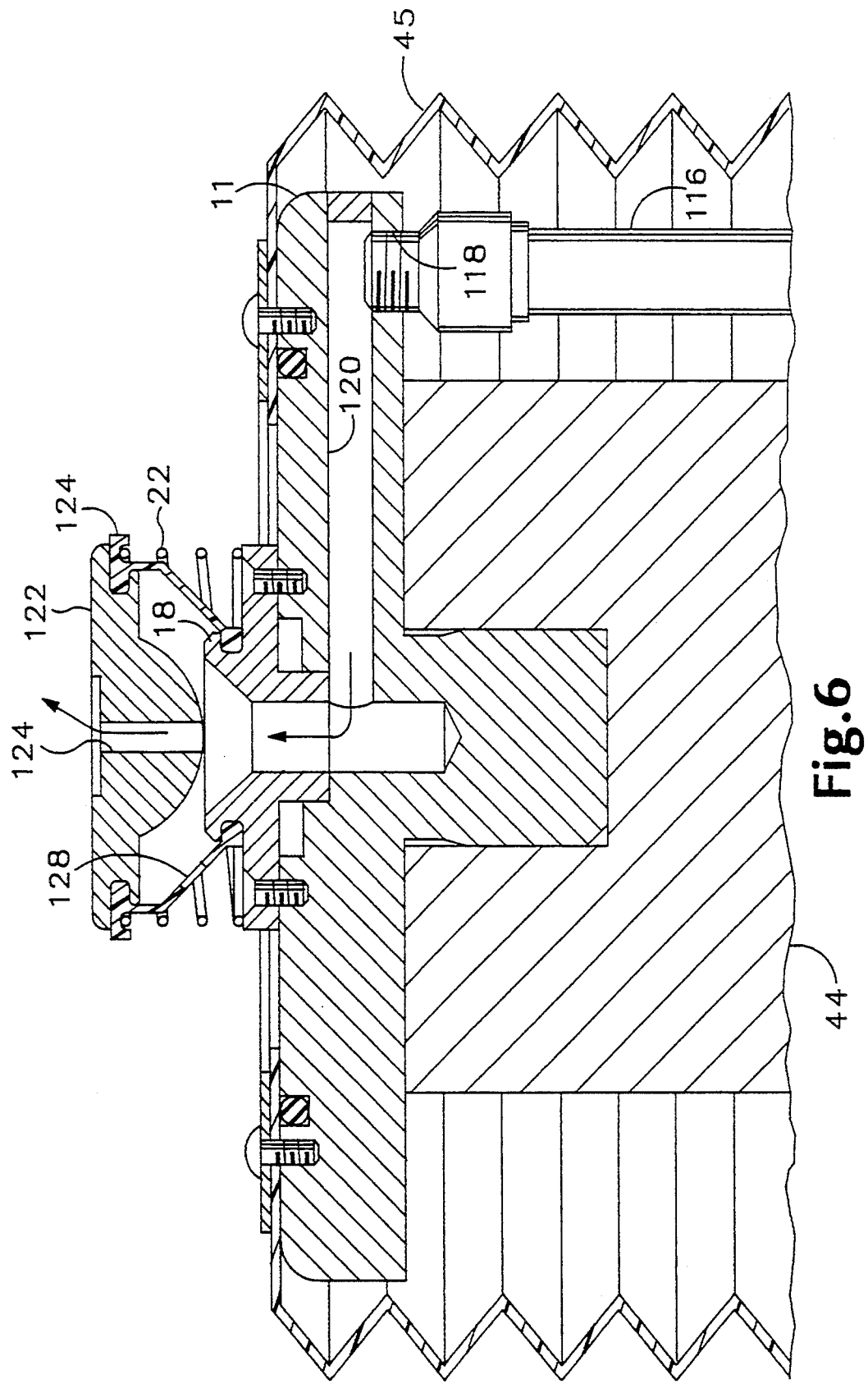
FIG. 6 is a sectional view of an air bearing assembly in accordance with the invention.

A related problem solved in systems employing the end effector of the present invention is allowing lateral movement of the workpiece while the workpiece is moved into position, since in operation, the various stanchions and end effectors are adjusted to the appropriate height to provide the appropriate contour for the particular workpiece. At this point, it is desired to move the workpiece around to a position whereby tooling points at the edges of the workpiece may be engaged (or the workpiece may be moved against stops) to ensure the workpiece is translated to the proper position. Thus, the end effector of the present invention is modified to provide an air bearing for generating a cushion of air upon which the workpiece may be slid while positioning. FIG. 6 is an illustration of an air bearing embodiment according to the present invention. The air bearing as illustrated in FIG. 6 employs a number of components that correspond to those employed with the end effector. The stanchion support 44 receives mounting plate 11. Similarly, bellows 45 are provided to protect against environmental conditions. However, in contrast to the end effector, the air bearing employs an air supply line 116 rather than a vacuum supply line 14. The air supply line engages base member 11 at an aperture 118 to provide positive air flow via air tube 120. Air tube 120 extends from the periphery of base member 11 to the center thereof in a lateral manner whereupon the air tube is in fluid communication with valve seat 18. A contact pad 122 supported by support spring 22 is held in spaced relation to contact seat 18. The contact pad has an aperture 124 extending from the top surface thereof through to the bottom thereof, centrally of the contact pad. This aperture then provides a conduit for air flow from air supply 116 through air supply 120 and valve seat 18. A urethane shroud 124 is also provided to assist in maintaining the positional relationship of valve seat 18 and contact pad 122, in conjunction with spring 22. Shroud 124 is similar in construction to shroud 26 of FIG. 1; however, a series of apertures 128 are provided in the shroud to provide fluid communication between interior space defined between the contact seat and the contact pad and the external space. These holes supply a path for air to escape and prevent the shroud from being blown off and disengaged from contact seat 18 or contact pad 122 when air pressure is present and the workpiece is pushed against the contact pad. Thus, in operation, air is provided via supply 116 and passes through the aperture 124 into the contact pad so as to provide a low pressure air supply over a large area (the surface of contact pad 122), allowing the workpiece to slide on the cushion of air at the contact pad. When the workpiece is placed on the air bearing, the contact pad will be pushed downwardly to firmly seat in contact seat 18. The spherical portion of the contact pad is then pushed down against the conical seat and since the spherical bearing to conical seat produces a line contact, with no area, the contact essentially provides a valve directing all the air from supply 116 through the aperture 124 in the contact pad. In operation, the typical air pressure is desirably less than 20 lbs. per square inch. Again, the spherical shape of the lower portion of the contact pad ensures the spatial position of the central point of contact with the workpiece is known to high precision without regard to the angularity of the workpiece at that particular contact point. While not shown in the illustrated embodiment, other embodiments of an air bearing may employ a proximity detector corresponding to the proximity detector 32 of FIG. 1.

FIG. 7 illustrates an exemplary configuration of the air bearing in conjunction with the end effector. In a typical configuration, support table 62 is provided with a series of spaced holes 130. The holes are adapted to receive either the air bearing or an end effector 10 therein. The configuration may be such that a number of holes in the table are left unfilled and air bearings and end effectors are positioned at appropriate points as determined by the particular workpiece configuration or configurations that will be supported. Each air bearing and end effector is adjusted to its appropriate height and the air supply is then turned onto the air bearing, thus providing air flow at the surface of the contact pad 122. The workpiece is then moved into position and is relatively easily slid into its final position because of the air cushion provided by the air bearing. Once the workpiece is in position, the air supply to the air bearings is shut off and the contact pad 122 then provides a hard support for the workpiece. At that point, the various suction cups 54 on the end effectors will be engaged by supplying vacuum thereto so as to tightly engage the workpiece. It will be noted that the bellows 45 are removed in FIG. 7 for clarity.

In a specific example employing the air bearings and end effectors of the present invention in fabrication of a wing skin for a horizontal stabilizer for an airplane, having dimensions of 60 foot in length and 10 feet in width and weighing approximately 1.5 tons, ten end effectors and five air bearings were employed. However, this is not a requirement and other densities and ratios of end effectors and air bearing may be employed. Thus, the configuration may also be changed and end effectors and air bearings may be reconfigured and moved to different holes 130 within the support table.

In the embodiments illustrated herein, contact pad 20 and contact pad 122 have a two inch outer diameter and are comprised of 316 stainless steel. Contact seat 18 is formed from C64200 bronze bar and base member 11 is formed from 6061-T6 aluminum round bar, suitably having a six inch outer diameter. Shroud 26 and shroud 124 comprise 60A urethane. Suction cup 54 is a Piab Vacuum Products model 31.50.107, while spring member 56 is a 0.06 stainless steel wire, 3.25 inch outer diameter, 0.5 end gap spring. Spring 22 is a 0.045 stainless steel 4 TC 1.6 inch inner diameter spring. Proximity detector 32 is suitably a 2 MM sensing two wire proximity switch, part number IEC-2002-AROG, sold by efector, Inc. of Exton, Pa. Support ring 100 is milled from four inch schedule 40 pipe, suitably of 304 stainless steel. Servo motor 78 is a Pacific Scientific model R32-GEBC-R2-NS-VS-03 and limit switches 80, 82 and 84 are Industrial Devices model numbers RPS-2. Vacuum switch 86 is suitably an SMC model NZSE2-T1-152.

Apparatus and systems for supporting workpieces at known positions that allow precise determination of position at a contact surface without regard to the angularity of the workpiece have been shown and described. However, while plural embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An apparatus for engaging a workpiece comprising:
   a contact pad adapted to contact a surface of the workpiece along an area thereof;
   swivel means for enabling said contact pad to swivel in two planes while maintaining a contact point on the surface of the contact pad at a known position for engaging the workpiece at a known position; and
   means defining a vacuum plenum containing the area of the surface of the workpiece, said contact pad and said swivel means therewithin.

2. An apparatus for engaging a workpiece comprising:
   sealing means for engaging a surface of the workpiece and for providing a substantially air tight seal against the surface of the workpiece and defining a vacuum plenum within the boundaries of the sealing means and the surface;
   vacuum supply means for providing vacuum to said vacuum plenum;
   a contact pad positioned within the vacuum plenum defined by the surface of the workpiece and the sealing means and adapted to contact the surface along an area thereof; and
   swivel means for enabling said contact pad to swivel in two planes while maintaining a contact position on the surface of the contact pad at a known position for engaging the workpiece at a known position, said swivel means being located within the vacuum plenum.

3. An apparatus according to claim 2 further comprising sensor means for determining when said contact pad is in contact with the surface of the workpiece.

4. Apparatus according to claim 2 further comprising a support member to support the workpiece at a known height relative to the contact surface of said contact pad.

5. Apparatus according to claim 4 wherein said support member comprises an annular support ring peripherally disposed about said contact pad.

6. A system for supporting a workpiece in a known configuration comprising:
   a plurality of actuators in spaced relation to one another, ones of said actuators adapted to translate in at least one axis;
   first ones of said actuators carrying apparatus for engaging a workpiece, said engaging apparatus comprising:
   sealing means for engaging a surface of the workpiece and for providing a substantially air tight seal against the surface of the workpiece and defining a vacuum plenum within the boundaries of the sealing means and the surface;
   vacuum supply means for providing vacuum to said vacuum plenum;
   a first contact pad positioned within the vacuum plenum defined by the surface of the workpiece and the sealing means and adapted to contact the surface of the workpiece along a first area thereof; and
   swivel means for enabling said contact pad to swivel in two planes while maintaining a contact position on the surface of the contact pad at a known position for engaging the workpiece at a known position, said swivel means being located within the vacuum plenum.

7. A system according to claim 6 wherein said engaging apparatus further comprises first sensor means for determining when said first contact pad is in contact with the surface of the workpiece.

8. An apparatus for engaging a workpiece according to claim 1 further comprising vacuum supply means for providing vacuum to the vacuum plenum and vacuum detection means for determining whether vacuum has been established within the vacuum plenum.

9. An apparatus for engaging a workpiece according to claim 1 further comprising:
   a proximity detector; and
   biasing means for maintaining said contact pad in spaced relation to said proximity detector, wherein when said contact pad is in contact with the surface of the workpiece in a desired configuration, said contact pad is moved against said biasing means to be brought into proximity with said proximity detector for causing said proximity detector to indicate that said contact pad is in contact with the workpiece.

10. An apparatus according to claim 3 wherein said sensor means comprises a proximity detector and wherein a biasing spring is provided, said biasing spring maintaining said contact pad in spaced relation to said proximity detector in the absence of contact between the contact pad and the workpiece and enabling said contact pad to be brought sufficiently close to said proximity detector so as to enable said proximity detector to indicate proximity of the contact pad when said contact pad is contacting the surface of the workpiece.

11. An apparatus according to claim 1 further comprising a support member external the vacuum plenum for providing additional support to a workpiece.

12. An apparatus according to claim 11 wherein the support member comprises an annular ring wherein said contact pad, said swivel means and said vacuum plenum are positioned within the interior area of said annular ring.

13. An apparatus according to claim 2 further comprising a support member external the vacuum plenum for providing additional support to a workpiece.

14. An apparatus according to claim 13 wherein the support member comprises an annular ring wherein said contact pad, said swivel means and said vacuum plenum are positioned within the interior area of said annular ring.

15. An apparatus according to claim 6 further comprising a support member external the vacuum plenum for providing additional support to a workpiece.

16. An apparatus according to claim 15 wherein the support member comprises an annular ring wherein said contact pad, said swivel means and said vacuum plenum are positioned within the interior area of said annular ring.

17. An apparatus according to claim 2 wherein said sealing means includes a suction cup portion.

18. An apparatus according to claim 2 wherein said swivel means comprises a spherical portion and a corresponding conical seat portion, wherein said spherical portion and said conical seat portion are maintained in spaced relation to one another in the absence of the presence of a workpiece by a biasing spring.

19. An apparatus according to claim 18 wherein the volume between said conical seat and the spherical member is substantially sealed against contamination by a shroud member.

* * * * *